US005877099A

United States Patent [19]
Cohen

[11] Patent Number: 5,877,099
[45] Date of Patent: Mar. 2, 1999

[54] FILTER MATRIX

[76] Inventor: Bernard Cohen, 381 Lakeshore Dr., Berkeley Lake, Ga. 30136

[21] Appl. No.: 791,011

[22] Filed: Jan. 27, 1997

Related U.S. Application Data

[63] Continuation of Ser. No. 450,043, May 25, 1995, abandoned.

[51] Int. Cl.⁶ ..................................................... B32B 27/00
[52] U.S. Cl. .......................... 442/405; 442/400; 442/401; 442/403; 442/406; 442/407; 442/411; 442/413; 442/415; 442/416
[58] Field of Search .................................... 442/400, 401, 442/403, 405, 406, 407, 411, 413, 415, 416

[56] References Cited

U.S. PATENT DOCUMENTS

| | | | |
|---|---|---|---|
| Re. 32,171 | 6/1986 | van Turnhout | 55/155 |
| 668,791 | 2/1901 | Blake et al. . | |
| 813,063 | 2/1906 | Sutton et al. . | |
| 859,998 | 7/1907 | Wentworth . | |
| 924,032 | 6/1909 | Blake et al. . | |
| 1,222,305 | 4/1917 | Kraus . | |
| 1,297,159 | 3/1919 | Hedberg . | |
| 1,355,477 | 10/1920 | Howell . | |
| 2,106,865 | 2/1938 | Bantz et al. | 209/127 |
| 2,217,444 | 10/1940 | Hill | 91/18 |
| 2,328,577 | 9/1943 | Oglesby | 117/17 |
| 2,378,067 | 3/1945 | Cook, Jr. | 209/127 |
| 2,398,792 | 4/1946 | Johnson | 209/127 |
| 3,012,668 | 12/1961 | Fraas | 209/127 |
| 3,338,992 | 8/1967 | Kinney . | |
| 3,341,007 | 9/1967 | Mayer et al. | 209/2 |
| 3,341,394 | 9/1967 | Kinney . | |
| 3,380,584 | 4/1968 | Fulwyler | 209/3 |
| 3,402,814 | 9/1968 | Morel et al. | 209/127 |
| 3,502,763 | 3/1970 | Hartmann . | |
| 3,542,615 | 11/1970 | Dobo et al. . | |
| 3,581,886 | 6/1971 | Singewald et al. | 209/9 |
| 3,692,618 | 9/1972 | Dorschner et al. . | |
| 3,802,817 | 4/1974 | Matsuki et al. . | |

(List continued on next page.)

FOREIGN PATENT DOCUMENTS

| | | | |
|---|---|---|---|
| 1 188 452 | 6/1985 | Canada . | |
| 0 334 829 | 9/1989 | European Pat. Off. . | |
| 0 337 662 | 10/1989 | European Pat. Off. . | |
| 0 375 234 | 6/1990 | European Pat. Off. . | |
| 0 391 725 | 10/1990 | European Pat. Off. . | |
| 0 444 671 | 9/1991 | European Pat. Off. . | |
| 0 462 574 | 12/1991 | European Pat. Off. . | |
| 0 478 011 | 4/1992 | European Pat. Off. | A61F 13/15 |
| 0 520 798 | 12/1992 | European Pat. Off. | D04H 1/42 |
| 0 550 029 | 7/1993 | European Pat. Off. . | |
| 0 575 629 | 12/1993 | European Pat. Off. . | |
| 0 594 123 | 4/1994 | European Pat. Off. . | |
| 44 47 152 | 7/1995 | Germany | A61L 15/60 |
| 58-076118 | 7/1958 | Japan . | |
| 62-053719 | 8/1987 | Japan . | |
| 62-074423 | 9/1987 | Japan . | |
| 1-246413 | 10/1989 | Japan . | |
| 05-064713 | 3/1993 | Japan . | |
| 2 026 379 | 2/1980 | United Kingdom | D06M 9/00 |
| 2 242 142 | 9/1991 | United Kingdom | B03C 3/28 |
| 81/03265 | 11/1981 | WIPO . | |
| 91/08254 | 6/1991 | WIPO . | |
| 92/16681 | 10/1992 | WIPO | D04H 1/42 |
| 93/06168 | 4/1993 | WIPO . | |
| 93/09156 | 5/1993 | WIPO | C08G 8/18 |
| 95/05232 | 2/1995 | WIPO . | |
| 95/05501 | 2/1995 | WIPO . | |

OTHER PUBLICATIONS

Database WPI, Section Ch, Week 8428, Derwent Publications Ltd., London, GB; Class A87, AN 84–173431, XP002008760, & JP,A,59 094 621 (Unitika KK), 31 May 1984, see abstract.

Patent Abstracts of Japan, vol. 10, No. 71 (C–334), 20 Mar. 1986 & JP,A,60 209220 (Kouken K.K.), 21 Oct. 1985, see abstract.

Patent Abstracts of Japan, vol. 6, No. 191 (C–127), 30 Sep. 1982 & JP,A,57 105217 (Nitta K.K.), 30 Jun. 1982, see abstract & Chemical Abstracts, vol. 97, No. 26, 27 Dec. 1982, Columbus, Ohio, US; abstract No. 218901, "Fibrous Filtering Material", see abstract.

Patent Abstracts of Japan, vol. 11, No. 315(C–451), 14 Oct. 1987 & JP,A,62 102809 (Mitsui Petrochem. Ind. Ltd.), 13 May 1987, see abstract & Database WPI, Section Ch, Week 8725, Derwent Publications Ltd., London, GB; Class A12, AN 87–172842 & JP,A,62 102 809 (Mitsui Petrochem. Ind. Co. Ltd.), 13 May 1987, see abstract.

Journal of Electrostatics, vol. 21, 1988, Amsterdam NL, pp. 81–98, XP002012022, P. A. Smith & G.C. East: "Generation of Triboelectric Charge in Textile Fibre Mistures, and their use as Air Filters", see document.

An Introduction to Electrostatic Separation, Technical Bulletin, Bulletin 8570, Carpco, Inc.

Electrostatic Separation of Mixed Granular Solids by Oliver C. Ralston, Elsevier Publishing Company, 1961, Chapter IV, "Applications of Electrostatic Separation", pp. 134–234.

USSN 08/242,948 filed May 16, 1994 entitled "Nonwoven Absorbent Polymeric Fabric Exhibiting Improved Fluid Management And Methods For Making The Same".

J. van Turnhout, Topics in Applied Physics, vol. 33, Ch. 3, pp. 81–225 (1980).

J. van Turnhout, Thermally Stimulated Discharge of Polymer Electrets, Ch. 1, pp. 1–24 (1975).

G. M. Sessler, Electronic Properties of Polymers, Ch. 3, pp. 59–107.

Search Report for PCT/US95/15488 dated Nov. 10, 1996.

*Primary Examiner*—Helen L. Pezzuto

[57] ABSTRACT

A web, formed from dielectric fibers and non-dielectric fibers, which has been subjected to corona discharge to improve the particulate filtration properties of the web is provided. The dielectric and non-dielectric fibers may be intermingled within the web such that the distribution of the dielectric and non-dielectric fibers within the web is generally uniform. In one embodiment, the dielectric fibers may be formed from a thermoplastic polymer, and particularly polyolefin and the non-dielectric fibers may be formed from cellulose, and particularly wood pulp.

20 Claims, No Drawings

5,877,099
Page 2

U.S. PATENT DOCUMENTS

| | | | |
|---|---|---|---|
| 3,821,021 | 6/1974 | McMillin | 117/135.5 |
| 3,849,241 | 11/1974 | Butin et al. | |
| 3,909,009 | 9/1975 | Cvetko et al. | |
| 4,011,067 | 3/1977 | Carey, Jr. | 55/354 |
| 4,103,062 | 7/1978 | Aberson et al. | 428/283 |
| 4,140,607 | 2/1979 | Kreiseimeier et al. | 204/168 |
| 4,178,157 | 12/1979 | van Turnhout et al. | 55/155 |
| 4,215,682 | 8/1980 | Kubik et al. | 128/205.29 |
| 4,273,635 | 6/1981 | Beraud et al. | 204/165 |
| 4,298,440 | 11/1981 | Hood | 204/165 |
| 4,305,797 | 12/1981 | Knoll et al. | 204/180 R |
| 4,307,143 | 12/1981 | Meitner | |
| 4,308,223 | 12/1981 | Stern | 264/22 |
| 4,340,563 | 7/1982 | Appel et al. | |
| 4,353,799 | 10/1982 | Leonard | 210/321.3 |
| 4,357,234 | 11/1982 | Inculet et al. | 209/127 B |
| 4,363,723 | 12/1982 | Knoll et al. | 209/128 |
| 4,374,727 | 2/1983 | Takahashi et al. | 209/127 B |
| 4,375,718 | 3/1983 | Wadsworth et al. | 29/592 E |
| 4,443,515 | 4/1984 | Atlas | 428/224 |
| 4,455,195 | 6/1984 | Kinsley | |
| 4,455,237 | 6/1984 | Kinsley | |
| 4,507,539 | 3/1985 | Sando et al. | 219/121 PY |
| 4,514,289 | 4/1985 | Inculet | 209/127.3 |
| 4,547,420 | 10/1985 | Krueger et al. | 428/229 |
| 4,555,811 | 12/1985 | Shimalla | 2/51 |
| 4,588,537 | 5/1986 | Klaase et al. | 264/22 |
| 4,592,815 | 6/1986 | Nakao | 204/165 |
| 4,618,524 | 10/1986 | Groitzsch et al. | 428/198 |
| 4,622,259 | 11/1986 | McAmish et al. | 428/171 |
| 4,652,282 | 3/1987 | Ohmori et al. | 55/155 |
| 4,652,322 | 3/1987 | Lim | 156/181 |
| 4,657,804 | 4/1987 | Mays et al. | 428/212 |
| 4,663,220 | 5/1987 | Wisneski et al. | |
| 4,670,913 | 6/1987 | Morell et al. | 2/227 |
| 4,677,017 | 6/1987 | DeAntonis et al. | 428/214 |
| 4,689,241 | 8/1987 | Richart et al. | 427/28 |
| 4,699,823 | 10/1987 | Kellenberger et al. | 428/219 |
| 4,707,398 | 11/1987 | Boggs | 428/224 |
| 4,720,415 | 1/1988 | VanderWielen et al. | 428/152 |
| 4,729,371 | 3/1988 | Krueger et al. | 128/206.19 |
| 4,738,772 | 4/1988 | Giesfeldt | 209/2 |
| 4,749,348 | 6/1988 | Klaase et al. | 425/174.8 |
| 4,761,326 | 8/1988 | Barnes et al. | 428/219 |
| 4,795,668 | 1/1989 | Krueger et al. | 428/174 |
| 4,797,201 | 1/1989 | Kuppers et al. | 209/127.4 |
| 4,818,464 | 4/1989 | Lau | |
| 4,863,785 | 9/1989 | Berman et al. | 428/218 |
| 4,863,983 | 9/1989 | Johnson et al. | 524/140 |
| 4,874,399 | 10/1989 | Reed et al. | 55/2 |
| 4,874,659 | 10/1989 | Ando et al. | 428/221 |
| 4,886,527 | 12/1989 | Fottinger et al. | 55/156 |
| 4,917,942 | 4/1990 | Winters | 428/286 |
| 4,920,168 | 4/1990 | Nohr et al. | 524/188 |
| 4,948,515 | 8/1990 | Okumura et al. | 210/748 |
| 4,948,639 | 8/1990 | Brooker et al. | |
| 4,960,820 | 10/1990 | Hwo | 524/528 |
| 4,965,122 | 10/1990 | Morman | 428/225 |
| 4,983,677 | 1/1991 | Johnson et al. | 525/127 |
| 5,021,501 | 6/1991 | Ohmori et al. | 524/544 |
| 5,035,941 | 7/1991 | Blackburn | 428/286 |
| 5,051,159 | 9/1991 | Togashi et al. | 204/165 |
| 5,057,710 | 10/1991 | Nishiura et al. | 307/400 |
| 5,062,158 | 11/1991 | Oka et al. | 2/46 |
| 5,110,620 | 5/1992 | Tani et al. | 427/40 |
| 5,118,942 | 6/1992 | Hamade | 250/324 |
| 5,149,335 | 9/1992 | Kellenberger et al. | 604/372 |
| 5,165,979 | 11/1992 | Watkins et al. | 428/113 |
| 5,169,706 | 12/1992 | Collier, IV et al. | 428/152 |
| 5,173,356 | 12/1992 | Eaton et al. | 428/219 |
| 5,178,932 | 1/1993 | Perkins et al. | 428/198 |
| 5,183,701 | 2/1993 | Jacobs et al. | 428/229 |
| 5,188,885 | 2/1993 | Timmons et al. | 428/198 |
| 5,204,174 | 4/1993 | Daponte et al. | 428/286 |
| 5,206,061 | 4/1993 | Ando et al. | 428/34.7 |
| 5,213,881 | 5/1993 | Timmons et al. | 428/224 |
| 5,213,882 | 5/1993 | Sassa et al. | 428/224 |
| 5,226,992 | 7/1993 | Morman | 156/62.4 |
| 5,230,727 | 7/1993 | Pound et al. | 55/492 |
| 5,232,770 | 8/1993 | Joseph | 428/284 |
| 5,238,733 | 8/1993 | Joseph et al. | 428/284 |
| 5,244,482 | 9/1993 | Hassenboehler, Jr. | 55/528 |
| 5,247,072 | 9/1993 | Ning et al. | 536/97 |
| 5,256,176 | 10/1993 | Matsuura et al. | 55/528 |
| 5,257,982 | 11/1993 | Cohen et al. | 604/378 |
| 5,264,276 | 11/1993 | McGregor et al. | 428/252 |
| 5,284,703 | 2/1994 | Everhart et al. | |
| 5,286,326 | 2/1994 | Greve | 156/272.4 |
| 5,308,674 | 5/1994 | Zafiroglu | 428/102 |
| 5,336,545 | 8/1994 | Morman | 428/152 |
| 5,350,620 | 9/1994 | Sundet et al. | 428/172 |
| 5,389,202 | 2/1995 | Everhart et al. | |
| 5,397,413 | 3/1995 | Trimble et al. | 156/167 |
| 5,401,446 | 3/1995 | Tsai et al. | |
| 5,407,581 | 4/1995 | Onodera et al. | 210/654 |
| 5,409,766 | 4/1995 | Yuasa et al. | 428/224 |
| 5,411,576 | 5/1995 | Jones et al. | 95/57 |
| 5,436,066 | 7/1995 | Chen | 428/288 |
| 5,441,550 | 8/1995 | Hassenboehler, Jr. | 55/486 |
| 5,443,606 | 8/1995 | Hassenboehler, Jr. | 55/486 |
| 5,455,108 | 10/1995 | Quincy et al. | 428/266 |
| 5,456,972 | 10/1995 | Roth et al. | 428/224 |
| 5,472,481 | 12/1995 | Jones et al | 96/15 |
| 5,486,411 | 1/1996 | Hassenboehler, Jr. et al. | 428/286 |
| 5,491,022 | 2/1996 | Smith | 428/224 |
| 5,493,117 | 2/1996 | Tamaki et al. | 264/483 |
| 5,496,507 | 3/1996 | Angadjivand et al. | 264/423 |
| 5,503,745 | 4/1996 | Ogata et al. | 210/490 |

FILTER MATRIX

This is a continuation of application No. 80/450,043 filed May 25,1995, now abandoned.

FIELD OF INVENTION

This invention relates to filtration media, and particularly to a fibrous filtration media formed from a nonwoven web of cellulose pulp fibers and polyolefin fibers.

BACKGROUND OF THE INVENTION

Various particulate filtering media may be formed from diverse materials, such as glass fibers, asbestos fibers, synthetic polymer fibers, e.g., polyolefins, polyamides, polyesters and the like, and natural fibers, such as wood pulp and the like. Desirably, a particulate filter medium should possess a high particulate filtration efficiency, but should also possess a high filtered fluid (e.g., gas or liquid) permeability. However, these performance attributes tend to be inversely related. For example, in some instances, increasing the particulate filtration efficiency of a filter media may tend to increase the pressure differential at the filter media between the filtered fluid and the unfiltered fluid.

As is known in the filtration art, filtration efficiency is improved by improving the ability of the filter media to mechanically entrap contaminates. In some instances, the filter media's ability to mechanically entrap contaminates, such as air born particulates, is improved by increasing the loft or thickness of the filter media without increasing the density of the filter media.

However, increasing the filter media's thickness has several disadvantages. In some instances, existing filter receiving structures may not be large enough to receive such thickened filters. In other instances, and particularly in those instances when the filter media is formed from a conform of wood pulp and polymer fibers, such increased thickness is generally achieved by incorporating increased quantities of the conformed materials. Increasing the quantities of these materials not only results in increased material costs and shipping costs but also reduces the filter material's fluid throughput by increasing the pressure differential across the filter media.

Therefore, there exists a need for a filter media, and particularly for filter media formed from a conform of wood pulp and polymer fibers, and methods of making the same which provides improved filtration efficiencies over conventional filter media formed from similar materials and which avoids the problems associated with conventional methods of improving the filtration efficiencies of filter media.

SUMMARY OF THE INVENTION

In response to the above problems encountered by those skilled in the art, the present invention provides a web, formed from dielectric fibers and non-dielectric fibers, which has been subjected to corona discharge. The dielectric and non-dielectric fibers may be intermingled within the web such that the distribution of the dielectric and non-dielectric fibers within the web is generally uniform. In one embodiment, the dielectric fibers may be formed from a thermoplastic polymer, and particularly polyolefin and the non-dielectric fibers may be formed from cellulose, and particularly wood pulp.

The percent weight of dielectric fibers present in the web may range from about 1% to 99% weight of the web and particularly from about 5% to 95% weight of the web, and particularly from about 10% to 90% weight of the web, and more particularly from about 20% to 80% weight of the web, and still more particularly from about 30% to 70% weight of the web, and still more particularly from about 40% to 60% weight of the web. Generally, the percent weight of non-dielectric fibers present in the web may range from about 1% to 99% weight of the web, and particularly from about 5% to 95% weight of the web, and particularly from about 10% to 90% weight of the web, and more particularly from about 20% to 80% weight of the web, and still more particularly from about 30% to 70% weight of the web, and still more particularly from about 40% to 60% weight of the web.

DETAILED DESCRIPTION OF THE INVENTION

As used herein, the term "dielectric" means, according to *McGraw-Hill Encyclopedia of Science & Technolocy*, 7th Edition, Copyright 1992, a material, such as a polymer, which is an electrical insulator or in which an electric field can be sustained with a minimum dissipation of power. A solid material is a dielectric if its valence band is full and is separated from the conduction band by at least 3 eV.

As used herein, the term "nonwoven web" refers to a web that has a structure of individual fibers or filaments which are interlaid, but not in an identifiable repeating manner.

As used herein the term "spunbonded fibers" refers to fibers which are formed by extruding molten thermoplastic material as filaments from a plurality of fine, usually circular capillaries of a spinnerette with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. Nos. 3,502,763 and 3,909,009 to Levy, and U.S. Pat. No. 3,542,615 to Dobo et al which are all herein incorporated by reference.

As used herein the term "meltblown fibers" means fibers formed by extruding a molten thermoplastic material through a plurality of fine, usually circular, die capillaries as molten threads or filaments into a high velocity, usually heated gas (e.g. air) stream which attenuates the filaments of molten thermoplastic material to reduce their diameter. Thereafter, the meltblown fibers are carried by the high velocity gas stream and are deposited on a collecting surface to form a web of randomly disbursed meltblown fibers. Meltblowing is described, for example, in U.S. Pat. No. 3,849,241 to Buntin, U.S. Pat. No. 4,307,143 to Meitner et al., and U.S. Pat. No. 4,707,398 to Wisneski et al which are all herein incorporated by reference.

The present invention provides a web, formed from dielectric fibers and non-dielectric fibers, which has been subjected to corona discharge. The dielectric and non-dielectric fibers may be intermingled within the web such that the distribution of the dielectric and non-dielectric fibers within the web is generally uniform. The web formed from intermingled dielectric and non-dielectric fibers may be in the form of a woven web or nonwoven web. Nonwoven webs formed from intermingled dielectric and non-dielectric fibers can be made from a variety of processes including, but not limited to, conforming processes and hydroentangling processes.

It has been found that webs formed from thermoplastic based dielectric fibers and particularly polyolefin based dielectric fibers are well-suited for use in the present invention. Generally, dielectric materials suitable for forming dielectric fibers of the present invention include, but are not limited to, polyesters, polyolefins, nylon and copolymers, polymer blends and bi-component polymers of these materials. Generally, these fibers may be melt extruded fibers such as, for example, meltblown fibers or spunbonded fibers. It has been found that nonwoven webs formed from polyolefin-based fibers and particularly polypropylene-based fibers are particularly well-suited for use in the present invention.

It has also been found that cellulose based non-dielectric fibers and particularly wood pulp based fibers are particularly well-suited for use in the present invention. Generally, non-dielectric materials suitable for forming non-dielectric fibers include, but are not limited to, cellulose, such as wood pulp, glass, wool and protein polymers.

Generally, the percent weight of dielectric fibers present in the web may range from about 1% to 99% weight of the web and all percent weight ranges of the web therebetween. Desirably, the percent weight of dielectric fibers present in the web may range about 5% to 95% weight of the web, and particularly from about 10% to 90% weight of the web, and more particularly from about 20% to 807 weight of the web, and still more particularly from about 30% to 70% weight of the web, and still more particularly from about 40% to 60% weight of the web.

Generally, the percent weight of non-dielectric fibers present in the web may range from about 1% to 99% and all ranges of the web therebetween. Desirably, the percent weight of non-dielectric fibers present in the web may range from about 5% to 95% weight of the web, and particularly from about 10% to 90% weight of the web, and more particularly from about 20% to 80% weight of the web, and still more particularly from about 30% to 70% weight of the web, and still more particularly from about 40% to 60% weight of the web.

Methods of subjecting the web to corona discharge, are well known by those skilled in the art. Briefly, corona discharge is achieved by the application of sufficient direct current (DC) voltage to an electric field initiating structure (EFIS) in the proximity of an electric field receiving structure (EFRS). The voltage should be sufficiently high such that ions are generated at the EFIS and flow from the EFIS to the EFRS. Both the EFIS and the EFRS are desirably formed from conductive materials. Suitable conductive materials include conductive metals such as, copper, tungsten, stainless steel and aluminum.

One particular technique of subjecting the web to corona discharge is the technique disclosed in U.S. Pat. No. 5,401,446, which is assigned to the University of Tennessee, and is herein incorporated by reference. This technique involves subjecting the web to a pair of electrical fields wherein the electrical fields have opposite polarities. Each electrical field forms a corona discharge.

EXAMPLES

The following examples demonstrate several embodiments of the present invention. Such examples, however, are not to be construed as limiting in any way either the spirit or scope of the present invention. Two sets of web samples, SAMPLE 1 and SAMPLE 2, were evaluated. Each set of web samples was formed from dielectric fibers and non-dielectric fibers.

SAMPLE 1

SAMPLE 1 included 7 nonwoven webs each having a basis weight of 150 grams per square meter (gsm). The percent weight range of dielectric and non-dielectric fibers in each of the SAMPLE 1 nonwoven webs was varied to achieve the respective distributions of the dielectric and non-dielectric fibers reported in TABLE II. The SAMPLE 1 nonwoven webs were formed by the process described in U.S. Pat. No. 4,818,464, which is herein incorporated by reference. These nonwoven webs were generally prepared using the conditions listed in TABLE I. The dielectric fibers were formed from Himont PF015 polypropylene. The non-dielectric fibers were formed from Weyerhauser NF405 cellulose pulp.

TABLE I

Conditions Used To Prepare SAMPLE 1 Webs
Code 1

| | Extr #1 | Extr #2 |
|---|---|---|
| PP Pump Rate (RPM) | 12 | 12 |
| Zone 1 Temp | 300° F. | 300° F. |
| Zone 2 Temp | 370° F. | 370° F. |
| Zone 3 Temp | 420° F. | 420° F. |
| Zone 4 Temp | 480° F. | 480° F. |
| Zone 5 Temp | 500° F. | 500° F. |
| Zone 6 Temp | 500° F. | 500° F. |
| Extruder Melt Temp | 517° F. | 510° F. |
| Hose Temp | 500° F. | 500° F. |
| Adapter Temp | 500° F. | 500° F. |
| Spin Pump Body Temp | 500° F. | 500° F. |
| Die Zone 1 | 500° F. | 500° F. |
| Die Zone 2 | 500° F. | 500° F. |
| Die Zone 3 | 500° F. | 500° F. |
| Die Zone 4 | 500° F. | 500° F. |
| Die Tip Melt Temp | 505° F. | 508° F. |
| Primary Air Temp | — | — |
| Extruder Pressure | 300 | 150 |
| Spin Pump Pressure | 147 | 139 |
| Adapter Pressure | 300 | 300 |
| Melt Pressure | 110 | 320 |
| Primary Air Pressure | 7 | 7 |
| Prim Air Htr 20" line | 570 | — |
| Primary Air Heater | — | — |
| Priinary Air Flow 2 | 470 | — |
| CET Feed rpm | 7 | — |
| Line Speed fpm | 213 | — |
| Die Angles | 48° | 49° |
| Tip to Tip Distance | 6 ¾" | 6 ¾" |
| Tip to Wire Distance | 12 ¾" | 11 ½" |
| Forming Height | — | |
| CET Duct to Wire Dist | 18 ½" | |
| Under Wire Zone 1 | 0 | |
| Under Wire Zone 2 | −4 | |
| Under Wire Zone 3 | −16 | |
| Under Wire Zone 4 | −15 | |
| Under Wire Zone 5 | −3 | |
| Under Wire Zone 6 | −6 | |

Note:
All Pressures are in pounds per square inch (psi)

Several of the SAMPLE 1 nonwoven webs were subjected to corona discharge. The corona discharge was produced by using a Model No. P/N 25 A—120 volt, 50/60 Hz reversible polarity power unit (Simco Corp., Hatfield, Pa.), which was connected to the EFIS, and a Model No. P16V 120 V,.25A 50/60 Hz power unit (Simco Corp., Hatfield, Pa.) which was connected to the EFRS. The EFIS was a RC-3 Charge Master charge bar (Simco. Corp.) and the EFRS was a solid, three inch diameter, aluminum roller. The corona discharge environment was 70° F. and 53% relative humidity. As described in the above U.S. Pat. No. 5,401,446, two sets of EFIS/EFRS are used. The voltage applied to the first set of EFIS/EFRS was 15 KV/0.0 KV, respectively. The voltage applied to the second set of EFIS/EFRS was 25 KV/7.5 KV, respectively. The gap between the EFIS and the EFRS for each set was one inch.

The particulate filtration properties of the SAMPLE 1 nonwoven webs exposed to corona discharge (Post Corona—TABLE II) were compared to the SAMPLE 1 nonwoven webs which were not exposed to corona discharge (Pre Corona—TABLE II).

The particulate filtration test used to evaluate the particulate filtration properties of these SAMPLES is generally known as the NaCl Filter Efficiency Test (hereinafter the "NaCl Test"). The NaCl Test was conducted on an automated filter tester, CERTITEST™ Model# 8110, which is available from TSI Inc., St. Paul, Minn. The particulate filtration efficiency of the test fabric is reported as "% penetration". The "% penetration" is calculated by the following formula: 100× (downstream particles/upstream particles). The upstream particles represent the total quantity of approximately 0.1 μm NaCl aerosol particles which are introduced into the tester. The downstream particles are those particles which have been introduced into the tester and which have passed through the bulk of the test fabric. Therefore, the "% penetration" value reported in TABLE II is a percentage of the total quantity of particles introduced into a controlled air flow within the tester which pass through the bulk of the test fabric. The size of the test fabric was 4.5" in diameter.

TABLE II

SAMPLE 1

| | | % Penetration-0.1 μm NaCl | |
|---|---|---|---|
| % wt Pulp | % wt Polypropylene | Pre Corona | Post Corona |
| 90 | 10 | 49.3 | 37.1 |
| 80 | 20 | 55.4 | 38.4 |
| 70 | 30 | 56.3 | 23.7 |
| 60 | 40 | 53.4 | 13.6 |
| 50 | 50 | 42.7 | 9.72 |
| 30 | 70 | 43.8 | 3.43 |
| 20 | 80 | 35.7 | 2.53 |
| 0 | 100 | 43.5 | 0.4 |

SAMPLE 2

SAMPLE 2 included 2 nonwoven webs having different basis weights (See TABLE III). Each of the nonwoven webs were formed from a combination of dielectric and non-dielectric fibers. The percent weight range of dielectric and non-dielectric fibers for each nonwoven web was also varied. The dielectric fibers were formed from Shell DX5E65 polypropylene. The non-dielectric fibers were formed primarily from Northern Softwood Kraft pulp.

The SAMPLE 2 nonwoven webs were formed by hydroentangling as described in U.S. Pat. Nos. 5,284,703 and 5,389,202, which are herein incorporated by reference.

A portion of the SAMPLE 2 nonwoven webs were subjected to corona discharge. The corona discharge was produced by using a Model No. P/N 25 A—120 volt, 50/60 Hz reversible polarity power unit (Simco Corp., Hatfield, Pa.), which was connected to the EFIS, and a Model No. P16V 120 V,.25 A 50/60 Hz power unit (Simco Corp., Hatfield, Pa.) which was connected to the EFRS. The EFIS was a RC-3 Charge Master charge bar (Simco. Corp.) and the EFRS was a solid, three inch diameter, aluminum roller. The corona discharge environment was 70° F. and 53% relative humidity. As described in the above U.S. Pat. No. 5,401,466, two sets of EFIS/EFRS are used. The voltage applied to the first set of EFIS/EFRS was 15 KV/0.0 KV, respectively. The voltage applied to the second set of EFIS/EFRS was 25 KV/7.5 KV, respectively. The gap between the EFIS and the EFRS for each set was one inch.

The particulate filtration properties of the SAMPLE 2 nonwoven webs which were exposed to corona discharge (Post Corona—TABLE III) were compared to the SAMPLE 2 nonwoven webs which were not exposed to corona discharge (Pre Corona—TABLE III).

The particulate filtration test used to evaluate the particulate filtration properties of these SAMPLES is generally known as the NaCl Filter Efficiency Test (hereinafter the "NaCl Test"). The NaCl Test was conducted on an automated filter tester, CERTITEST™ Model# 8110, which is available from TSI Inc., St. Paul, Minn. The particulate filtration efficiency of the test fabric is reported as "% penetration". The "% penetration " is calculated by the following formula: 100× (downstream particles/upstream particles). The upstream particles represent the total quantity of approximately 0.1 μm NaCl aerosol particles which are introduced into the tester. The downstream particles are those particles which have been introduced into the tester and which have passed through the bulk of the test fabric. Therefore, the "% penetration" value reported in TABLE III is a percentage of the total quantity of particles introduced into a controlled air flow within the tester which pass through the bulk of the test fabric. The size of the test fabric was 4.5" in diameter.

TABLE III

SAMPLE 2

| Basis | | | % Penetration-0.1 μm NaCl | |
|---|---|---|---|---|
| Wt. (gsm) | % Pulp | % polypropylene | Pre Corona | Post Corona |
| 86 gsm | 80 | 20 | 76.5 | 60.4 |
| 60 gsm | 77 | 23 | 86.5 | 69.2 |

It is clear from the data contained in TABLEs II and III, that the particulate filtration efficiency of a web formed from dielectric and non-dielectric materials is significantly improved by subjecting such webs to corona discharge.

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and any equivalents thereto.

What is claimed is:

1. A conformed web comprising dielectric and non-dielectric fibers, wherein the dielectric and non-dielectric fibers in the conformed web are intermingled such that the distribution of dielectric and non-dielectric fibers in the web is generally uniform, and wherein the conformed web has been subjected to DC corona discharge.

2. The web of claim 1 wherein the dielectric fibers are formed from a thermoplastic polymer.

3. The web of claim 1 wherein the dielectric fibers are formed from a polymer selected from the group consisting of polyesters, polyolefins, nylon and copolymers thereof.

4. The web of claim 1 wherein the dielectric fibers are formed from polypropylene.

5. The web of claim 1 wherein the non-dielectric fibers are formed from a material selected from the group consisting of cellulose, glass, wool and protein polymers.

6. The web of claim 1 wherein the percent weight of dielectric fibers present in the web ranges from between 5% to 95% weight of the web.

7. The web of claim 1 wherein the percent weight of dielectric fibers present in the web ranges from between 10% to 90% weight of the web.

8. The web of claim 1 wherein the percent weight of dielectric fibers present in the web ranges from between 20% to 80% weight of the web.

9. The web of claim 1, wherein the dielectric fibers comprise polypropylene, and the non-dielectric fibers comprise cellulose.

10. A woven web comprising dielectric fibers and non-dielectric fibers, wherein the dielectric and non-dielectric fibers in the web are intermingled such that the distribution of dielectric and non-dielectric fibers in the web is generally uniform; the percent weight of the non-dielectric fibers ranges from at least 5% to 95% weight of the web, and wherein the woven web has been subjected to DC corona discharge.

11. The web of claim 10 wherein the dielectric fibers are formed from a polymer selected from the group consisting of polyesters, polyolefins, nylon and copolymers thereof.

12. The web of claim 10 wherein the non-dielectric fibers are formed from a material selected from the group consisting of cellulose, glass, wool and protein polymers.

13. The web of claim 10 wherein the dielectric fibers are formed from polypropylene.

14. The web of claim 10, wherein the dielectric fibers comprise polypropylene, and the non-dielectric fibers comprise cellulose.

15. The web of claim 10, wherein the percent weight of dielectric fibers present in the web ranges from between 10% to 90% weight of the web.

16. The web of claim 15, wherein the percent weight of dielectric fibers present the web ranges from between 20% to 80% weight of the web.

17. A web comprising dielectric and non-dielectric fibers, wherein the dielectric and non-dielectric fibers are intermingled to form a single layer, the web being formed by a process comprising:

conforming dielectric and no-dielectric fibers into a single nonwoven layer; and subjecting single nonwoven layer DC corona discharge.

18. The web of claim 12, wherein the percent weight of dielectric fibers present in the web ranges from between 10% to 90% weight of the web.

19. The web of claim 18, wherein the percent weight of dielectric fibers present in the web ranges from between 20% to 80% weight of the web.

20. The web of claim 17, wherein the dielectric fibers comprise polypropylene, and the non-dielectric fibers comprise cellulose.

* * * * *

UNITED STATES PATENT AND TRADEMARK OFFICE
CERTIFICATION OF CORRECTION

PATENT NO. : 5,877,099   Page 1 of 5

DATED : March 2, 1999

INVENTOR(S): Cohen

It is certified that errors appear in the above-identified patent and that said Letters Patent is hereby corrected as shown below:

Title page,[73] -- Assignee: Kimberly-Clark Worldwide, Inc. Neenah, Wis.--;
Title page,[56] References Cited, U.S. PATENT DOCUMENTS, add:

```
    --Re. 30,782  10/1981   van Turnhout--;
    --Re. 31,285   6/1983   van Turnhout et al.--;
    --2,748,018    5/1956   Miller--;
    --2,998,051    8/1961   Sittel--;
    --3,059,772   10/1962   Baron--;
    --3,125,547    3/1964   Blatz--;
    --3,281,347   10/1966   Winder--;
    --3,323,933    6/1967   Barford et al.;
    --3,436,797    4/1969   Graf et al.--;
    --3,692,606    9/1972   Miller et al.--;
    --3,855,046   12/1974   Hansen et al.--;
    --3,859,330    1/1975   Proskow--;
    --3,896,802    7/1975   Williams--;
    --3,907,604    9/1975   Prentice--;
    --3,962,386    6/1976   Driscoll--;
    --3,979,529    9/1976   Rebentisch et al.--;
    --3,998,916   12/1976   van Turnhout--;
    --4,013,816    3/1977   Sabee et al.--;
    --4,035,164    7/1977   Taylor--;
    --4,041,203    8/1977   Brock et al.--;
    --4,058,724   11/1977   McKinney et al.--;
    --4,070,218    1/1978   Weber--;
    --4,091,140    5/1978   Harmon--;
    --4,096,289    6/1978   Nischwitz et al.--;
    --4,170,304   10/1979   Huke--;
    --4,185,972    1/1980   Nitta et al.--;
```

UNITED STATES PATENT AND TRADEMARK OFFICE

CERTIFICATION OF CORRECTION

PATENT NO. : 5,877,099

DATED : March 2, 1999

INVENTOR(S): Cohen

It is certified that errors appear in the above-identified patent and that said Letters Patent is hereby corrected as shown below:

```
--4,196,245    4/1980    Kitson et al.--;
--4,208,366    6/1980    Kinney--;
--4,209,563    6/1980    Sisson--;
--4,223,677    9/1980    Anderson--;
--4,310,478    1/1982    Balsley et al.--;
--4,323,374    4/1982    Shinagawa et al.--;
--4,324,198    4/1982    Muz--;
--4,342,812    8/1982    Selwood--;
--4,363,682   12/1982    Thiebault--;
--4,373,224    2/1983    Bandai et al.--;
--4,374,888    2/1983    Bornslaeger--;
--4,392,876    7/1983    Schmidt--;
--4,394,235    7/1983    Brandt et al.--;
--4,411,795   10/1983    Olson--;
--4,430,277    2/1984    Lin--;
--4,443,513    4/1984    Meitner et al.--;
--4,451,589    5/1984    Morman et al.--;
--4,456,648    6/1984    Adamse et al.--;
--4,492,633    1/1985    Sandulyak et al.--;
--4,513,049    4/1985    Yamasaki et al.--;
--4,517,143    5/1985    Kisler--;
--4,534,918    8/1985    Forrest Jr.--;
--4,551,378   11/1985    Carey, Jr.--;
--4,554,207   11/1985    Lee--;
--4,594,626    6/1986    Frangesh--;
--4,620,785    4/1997    Watt et al.--;
--4,623,438   11/1986    Felton et al.--;
--4,626,263   12/1986    Inoue et al.--;
```

UNITED STATES PATENT AND TRADEMARK OFFICE
CERTIFICATION OF CORRECTION

PATENT NO. : 5,877,099 　　　　　　　　　　　　　　　Page 3 of 5

DATED　　　: March 2, 1999

INVENTOR(S): Cohen

It is certified that errors appear in the above-identified patent and that said Letters Patent is hereby corrected as shown below:

```
--4,657,639    4/1987   Mahadevan et al.--;
--4,671,943    6/1987   Wahlquist--;
--4,705,171   11/1987   Eldridge--;
--4,714,647   12/1987   Shipp, Jr. et al.--;
--4,739,882    4/1988   Parikh et al.--;
--4,789,504   12/1988   Ohmori et al.--;
--4,797,318    1/1989   Brooker et al.--;
--4,826,703    5/1989   Kisler--;
--4,831,664    5/1989   Suda--;
--4,847,914    7/1989   Suda--;
--4,859,266    8/1989   Akasaki et al.--;
--4,883,052   11/1989   Weiss et al.--;
--4,894,131    1/1990   Jacobs et al.--;
--4,901,370    2/1990   Suda--;
--4,904,174    2/1990   Moosmayer et al.--;
--4,944,854    7/1990   Felton et al.--;
--5,012,094    4/1991   Hamade--;
--5,032,419    7/1991   Lamirand et al.--;
--5,055,151   10/1991   Duffy--;
--5,077,468   12/1991   Hamade--;
--5,090,975    2/1992   Requejo et al.--;
--5,112,048    2/1992   Deeds--;
--5,112,677    4/1992   Tani et al.--;
--5,135,724    4/1992   Dinter et al.--;
--5,138,971    8/1992   Nakajima et al.--;
--5,143,767    8/1992   Matsuura et al.--;
--5,156,902   10/1992   Pieper et al.--;
--5,246,637    9/1993   Matsuura et al.--;
```

UNITED STATES PATENT AND TRADEMARK OFFICE

CERTIFICATION OF CORRECTION

PATENT NO. : 5,877,099

DATED : March 2, 1999

INVENTOR(S): Cohen

It is certified that errors appear in the above-identified patent and that said Letters Patent is hereby corrected as shown below:

```
--5,254,297   10/1993   Deeds--;
--5,294,482    3/1994   Gessner--;
--5,306,534    4/1994   Bosses--;
--5,308,691    5/1994   Lim et al.--;
--5,436,033    7/1995   Mino et al.--;
--5,464,688   11/1995   Timmons et al.--;
--5,468,428   11/1995   Hanschen et al.--;
--5,482,765    1/1996   Bradley et al.--;
--5,552,012    9/1996   Morris et al.--;
--5,637,165    6/1997   Chen--;
```

Page 1 [56] References Cited, FOREIGN PATENT DOCUMENTS, add:

```
0 125 851    11/1984   European Pat. Off.
0 156 160    10/1985   European Pat. Off.
0 497 072     8/1992   European Pat. Off.
0 576 738     1/1994   European Pat. Off.
0 754 796     1/1997   European Pat. Off.
1 084 015     9/1957   Germany
90/11784     10/1990   WIPO
94/01068      1/1994   WIPO
94/00166      1/1994   WIPO
95/22646      8/1995   WIPO
96/00093      1/1996   WIPO
97/04155      2/1997   WIPO
```

Page 1 [56] References Cited, OTHER PUBLICATIONS, add:

"Bonding Process", IBM Technical Disclosure Bulletin, Vol. 14, No. 12, May 1972.
Database WPI, Section Ch, Week 8930, Derwent Publications, Ltd., London, GB; Class A94, AN 89-217687 XP992005648 & JP,A,01 156 578 (Showa Denko), 20 June 1989, See Abstract.

UNITED STATES PATENT AND TRADEMARK OFFICE
CERTIFICATION OF CORRECTION

PATENT NO. : 5,877,099

DATED : March 2, 1999

INVENTOR(S): Cohen

It is certified that errors appear in the above-identified patent and that said Letters Patent is hereby corrected as shown below:

Column 1, line 3, "80/450,043" should read --08/450,043--;
Column 1, line 36, "conform" should read --coform --;
Column 1, line 39, "conformed" should read --coformed--;
Column 1, line 46, "conform" should read --coform--;
Column 2, line 61, "conforming" should read --coforming--;
Column 3, line 21, "807" should read --80%--;
Column 6, line 49, claim 1, "conformed" should read --coformed--;
Column 6, line 51, claim 1, "conformed" should read --coformed--;
Column 6, line 53, claim 1, "conformed" should read --coformed--;
Column 8, line 13, claim 17, "conforming" should read --coforming--;
Column 8, line 13, claim 17, "no-dielectric" should read --non-dielectric--.

Signed and Sealed this

Ninth Day of May, 2000

Attest:

Q. TODD DICKINSON

*Attesting Officer*   *Director of Patents and Trademarks*